(12) United States Patent
Nessim et al.

(10) Patent No.: US 11,308,615 B1
(45) Date of Patent: Apr. 19, 2022

(54) SYSTEMS AND PROCESSES FOR IMPROVING MEDICAL DIAGNOSES

(71) Applicant: Maurice Nessim, Houston, TX (US)

(72) Inventors: Maurice Nessim, Houston, TX (US); Nicolae Moldoveanu, Nice (FR)

(73) Assignee: Maurice Nessim, Houston, TX (US)

( * ) Notice: Subject to any disclaimer, the term of this patent is extended or adjusted under 35 U.S.C. 154(b) by 0 days.

(21) Appl. No.: 17/365,607

(22) Filed: Jul. 1, 2021

(51) Int. Cl.
*G06T 7/00* (2017.01)
*G06T 5/50* (2006.01)

(52) U.S. Cl.
CPC .............. *G06T 7/0012* (2013.01); *G06T 5/50* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 10,165,964 B2 | 1/2019 | Yin et al. |
| 2003/0088365 A1 | 5/2003 | Becker |
| 2007/0100226 A1 | 5/2007 | Yankelevitz et al. |
| 2011/0145747 A1* | 6/2011 | Wong ................... A61B 5/7264 715/771 |
| 2017/0191945 A1* | 7/2017 | Zhang ................ G01N 21/9501 |
| 2020/0118282 A1* | 4/2020 | Patriarche ................. G06T 7/32 |
| 2020/0160511 A1 | 5/2020 | Lyman et al. |
| 2020/0250814 A1* | 8/2020 | Stoval, III ............. G06N 20/00 |
| 2020/0286228 A1 | 9/2020 | Guenther |
| 2020/0357120 A1 | 11/2020 | Kang et al. |
| 2021/0035341 A1* | 2/2021 | Lee ....................... G06N 3/0454 |

FOREIGN PATENT DOCUMENTS

WO  2015127355 A1  8/2015

\* cited by examiner

*Primary Examiner* — Samah A Beg
(74) *Attorney, Agent, or Firm* — Hunton Andrews Kurth LLP (57) ABSTRACT

Systems and methods for medical imaging and analysis are described. The systems and methods comprise generating raw medical image data from a medical imaging hardware device, processing the raw medical image data, generating a processed raw medical image file, transmitting the processed medical image data file and imaging data, identifying a normalization factor based on the imaging detail data, normalizing the processed medical image data file using the normalization factor, and comparing the processed medical image data file with at least one other processed medical image data file. The difference between the processed medical image file and the at least one other processed medical image file is subtracted. A graphical representation of the difference is generated and displayed.

21 Claims, 4 Drawing Sheets

SYSTEMS AND PROCESSES FOR IMPROVING MEDICAL DIAGNOSES

FIELD OF THE INVENTION

The present disclosure relates to systems and methods for improved medical diagnoses, and more particularly to normalizing medical image data generated from different medical imaging hardware device and software applications for improved medical diagnosis by utilizing machine learning processes.

BACKGROUND

Medical diagnostic technology has continue to advance, due in large part, to advances in medical imaging technologies. While a single MRI scan, for example, contains vital health information, two or more MRI scans taken at different points of time contain even more vital health information. For example, a comparison of the MRI scans can reveal the extent and rate at which a patient's tumor has grown, or the extent and rate at which a patient's bone has fully healed. There are, however, drawbacks to conventional methods of comparing medical images obtained at different times to obtain medical information. For example, such medical images may have been generated by different MRI machines, that each generate images containing non-uniform distortions and artifacts. Any medical information ascertained from comparing medical images contained from these different MRI machines, for example, would be tainted by the different distortions and artifacts caused by the different MRI machines.

Accordingly, there is a need to address these and related concerns.

SUMMARY

Exemplary embodiments of the present disclosure provide a computer implemented system, method, and system, method, and non-transitory computer-accessible medium for medical imaging and analysis, comprising: generating raw medical image data from a medical imaging hardware device; processing the raw medical image data, and generating a processed raw medical image file; extracting the attributes from the processed image that characterizes the image and could be used to describe uniquely the image, transmitting the processed medical image data file, imaging data and the attributes, identifying a normalization factor based on the imaging detail data and the signature of the imaging device; normalizing the processed medical image data file using the normalization factor; comparing the processed medical image data file with at least one other processed medical image data file, and performing "time-lapse medical imaging" by evaluating the difference between the processed medical image file with the at least one other processed medical image file generating at a previous time; and generating and displaying in a graphical user interface of a device, a graphical representation of the difference by the imaging analysis system. The comparison of the medical images obtained at different times, after the normalization factor was applied for each image, will be used to infer the evolution of the disease An example of normalization factor associated with each imaging device is the point spread function, that could be calculated for each devise and can be used to remove the imprint of the devise on the image.

Further exemplary embodiments include that the machine learning model includes at least one selected from the group of a hidden Markov model, a Gaussian mixture model, a pattern matching algorithm, a neural network, a matrix representation, (a vector quantization and decision tree, a supervised learning model, an unsupervised learning model, a semi-supervised learning model, a reinforcement learning model, a self-learning model, and a feature learning model. In addition, the processed raw medical image file is a still image type, a moving image type, or a combination thereof. Also, the medical imaging hardware device includes one of a MRI imaging device, x-ray imaging device, fluoroscopy imagine device, ultrasound device, endoscopy device, elastography device, thermography imaging device.

Further exemplary embodiments include generating a training data set comprising of processed medical image files and associated medical information data from a plurality of patients with a medical issue type; and training a predictive model using the training data set to determine at least one health prediction. In addition, the associated medical information includes genetic history of the patient and health behavior data, and wherein the predictive model determines at least one behavior modification suggestion.

BRIEF DESCRIPTION OF THE DRAWINGS

Various embodiments of the present disclosure, together with further objects and advantages, can best be understood by reference to the following description taken in conjunction with the accompanying drawings.

DETAILED DESCRIPTION OF THE EMBODIMENTS

The following description is intended to convey a thorough understanding of the embodiments described by providing a number of specific example embodiments and details involving AI-based systems and methods for managing data access. It should be appreciated, however, that the present disclosure is not limited to these specific embodiments and details, which are examples only. It is further understood that one ordinary skill in the art, in light of known systems and methods, would appreciate the use of the invention for its intended purposes and benefits in any number of alternative embodiments, depending on specific design and other needs.

The present disclosure is not to be limited in terms of the particular embodiments described herein, which are intended as illustrations of various aspects. Many modifications and variations can be made without departing from its spirit and scope, as can be apparent. Functionally equivalent methods and apparatuses within the scope of the present disclosure, in addition to those enumerated herein, can be apparent from the foregoing representative descriptions.

Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The below description, along with its associated embodiments, has been presented for purposes of illustration only. It is not exhaustive and does not limit the invention to the precise form disclosed. Those skilled in the art can appreciate from the below description that modifications and variations are possible in light of the below teachings or can be acquired from practicing the disclosed embodiments. For example, the steps described need not be performed in the same sequence discussed or with the same degree of separation. Likewise various steps can be omitted, repeated, or combined, as necessary, to achieve the same or similar objectives. Accordingly, the invention is not limited to the above-described embodiments, but instead is defined by the appended claims in light of their full scope of equivalents.

In the present disclosure, various preferred embodiments have been described with references to the accompanying drawings. It can, however, be evident that various modifications and changes can be made thereto, and additional embodiments can be implemented, without departing from the broader scope of the invention as set forth in the claims that follow. The present disclosure and drawings are accordingly to be regarded as an illustrative rather than restrictive sense.

The present disclosure provides methods and systems for improved medical diagnoses by aggregating medical images generated from a variety of medical imaging hardware devices, and software applications, applying machine learning processes to determine normalization factors for medical images generated from different hardware devices, and software applications, and comparing normalized medical images to obtain accurate health information relating to changes detected in different images. The present disclosure further includes aggregating a plurality of normalized medical images from different patients suffering from similar health issues, and such patient's associated health information, and applying machine learning processes on the aggregated data to make predictions about a particular patient's health, and improve medical diagnoses techniques using medical images.

Figure 1:
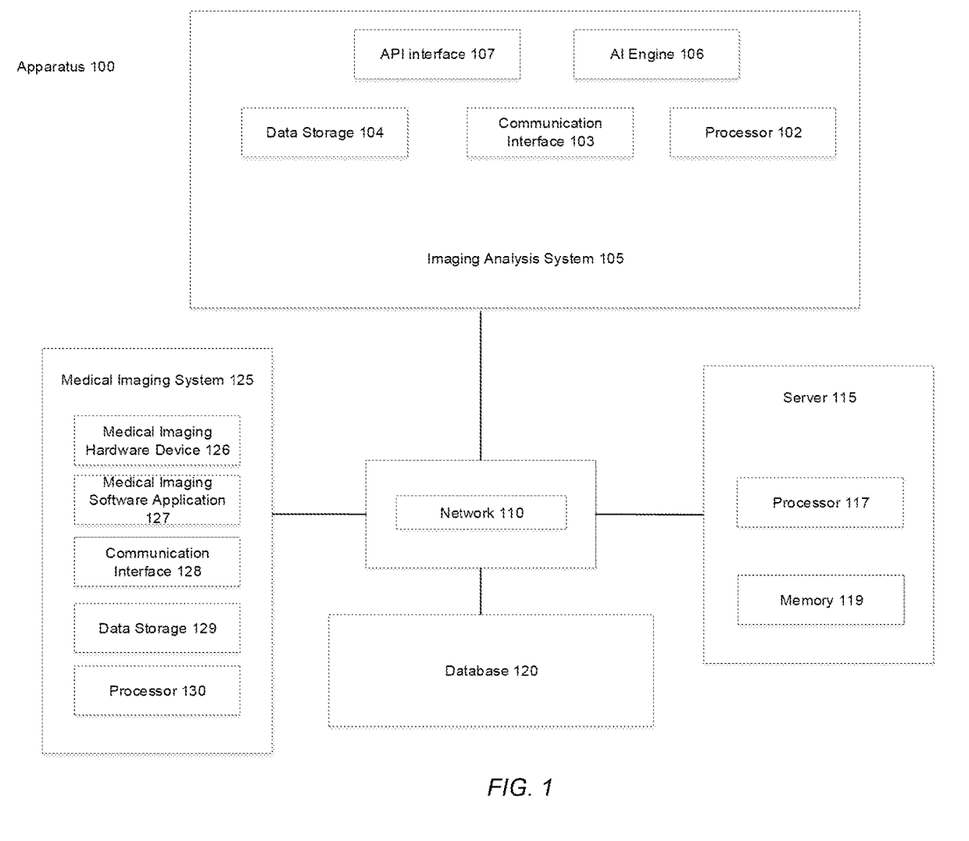
FIG. 1 illustrates an exemplary apparatus, including an imaging analysis system and medical imaging system for improving medical diagnoses.

FIG. 1 illustrates an exemplary apparatus 100 for improved medical diagnoses. The apparatus 100 can comprise a medical imaging analysis system 105, a network 110, a server 115, a database 120, and one or more medical image system 125.

The medical image system 125 and medical imaging analysis system 105 can each include a network-enabled computer system and/or device, or otherwise be able to be communicatively coupled to such a network-enabled computer system and/or device during certain periods of time. As referred to herein, a network-enabled computer system and/or device can include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems can execute one or more software applications to, for example, receive data as input from an entity accessing the network-enabled computer system, process received data, transmit data over a network, and receive data over a network.

The medical image system 125 and medical imaging analysis system 105 can each include at least one processor (102 and 130), which can be a central processing unit (CPU), which can be configured to execute computer program instructions to perform various processes and methods. The at least one CPU can comprise several processors, a single processor, or a single device having multiple processors.

The medical image system 125 and medical imaging analysis system 105 can each include a data storage (104, 130), including for example, random access memory (RAM) and read only memory (ROM), which can be configured to access and store data and information and computer program instructions. The data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which can include an all flash array, a hybrid array, or a server-side product, enterprise storage, which can include online or cloud storage, or any other storage mechanism.

Although depicted as single elements, it should be appreciated that according to one or more embodiments, medical image system 125 and medical imaging analysis system 105 can each comprise a plurality of medical image systems 125 and medical imaging analysis systems 105. As shown in FIG. 1, the medical image system 125 and medical imaging analysis system 105 can each include various components. As used herein, the term "component" can be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components can be combined, integrated, separated, or duplicated to support various applications. Also, a function described herein as being performed at a particular component can be performed at one or more other components and by one or more other devices instead of or in addition to the function performed at the particular component. Further, the components can be implemented across multiple devices or other components local or remote to one another. Additionally, the components can be moved from one device and added to another device, or can be included in both devices.

The medical imaging hardware device 126 can be, for example, a MRI imaging device, an X-RAY imaging device, a fluoroscopy imagine device, an ultrasound device, an endoscopy device, an elastography device, a thermography imaging device, and the like. Such a medical imaging hardware device 126 can include hardware capable of capturing an image of a patient, such as a camera or image sensor, or other means for detecting physical states of the patient.

The medical imaging system 125 can also include medical imaging software application for processing raw data received from the medical imaging hardware device into medical images. Medical imaging software application can also include software for scanning already existing medical images into a digital version thereof.

The medical imaging system 125 and imaging analysis system 105 can include components to send and/or receive data for use in other components, such as a communication interfaces 103 and 128. The communication interfaces 103 and 128 can include various hardware and software components, such as, for example, a repeater, a microwave antenna, or another network access device capable of providing connectivity between network mediums. The communication interfaces 103 and 128 can also contain various software and/or hardware components to enable communication over the network 110. For example, the communication interfaces 103 and 128 can be capable of sending or receiving signals via the network 110. Moreover, the communication interfaces 103 and 128 can provide connectivity to one or more wired networks and can be capable of receiving signals on a first medium (such as a wired network) and transmitting the received signals on a second medium (such as a wireless network).

As depicted in FIG. 1, the imaging analysis system 105 can include an Artificial Intelligence (AI) engine 106, a data storage 104, and a communication interface 103. The Imaging analysis system 105 can include data and/or components, systems, and interfaces, including application programming interfaces 107 (APIs) to enable the generation, transmission, and processing of data.

The data storage 104 and 129 can be a read-only memory, write-once read-multiple memory or read/write memory, e.g., RAM, ROM, and EEPROM, and the user device 125 and/or AI system 105 can include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it cannot be rewritten, but it can be read many times. A read/write memory can be programmed and re-programed many times after leaving the factory. It can also be read many times.

The AI Engine 106 can implement image analysis on medical images by using one or more machine learning algorithms and generated by the application of by one or more predictive models. In an embodiment, the machine learning algorithms employed can include at least one selected from the group of gradient boosting machine, logistic regression, neural networks, and a combination thereof, however, it is understood that other machine learning algorithms can be utilized.

For example, predictive models can be implemented to determine how certain tissue is growing (or how such tissue has grown) based on using a plurality of medical images as a training set. Predictive models can also be used to normalize of medical images received from disparate sources with different formats.

The predictive models described herein can utilize various neural networks, such as convolutional neural networks ("CNNs") or recurrent neural networks ("RNNs"), to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that can not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The predictive models described herein can be trained on one or more training datasets, each of which can comprise one or more types of data. In some examples, the training datasets can comprise previously-collected data, such as medical images previously taken stored in data storage. In some examples, the training dataset can include anticipated data, such as the anticipated medical images. In other examples, the training datasets can include previous predictions for the instant system and other types of system, and can further include results data indicative of the accuracy of the previous predictions. In accordance with these examples, the predictive models described herein can be training prior to use and the training can continue with updated data sets that reflect additional information.

System 100 can include a network 110. In some examples, network 110 can be one or more of a wireless network, a wired network or any combination of wireless network and wired network, and can be configured to connect to any one of components of system 100. In some examples, network 110 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 can include, without limitation, telephone lines, fiber optics, IEEE Ethernet 902.3, a wide area network, a wireless personal area network, a LAN, or a global network such as the Internet. In addition, network 110 can support an Internet network, a wireless communication network, a cellular network, or the like, or any combination thereof. Network 110 can further include one network, or any number of the exemplary types of networks mentioned above, operating as a stand-alone network or in cooperation with each other. Network 110 can utilize one or more protocols of one or more network elements to which they are communicatively coupled. Network 110 can translate to or from other protocols to one or more protocols of network devices. Although network 110 is depicted as a single network, it should be appreciated that according to one or more examples, network 110 can comprise a plurality of interconnected networks, such as, for example, the Internet, a service provider's network, a cable television network, corporate networks, such as credit card association networks, and home networks.

System 100 can further comprise one or more servers 115. In some examples, the server 115 can include one or more processors 117 coupled to memory 119. The server 115 can be configured as a central system, server or platform to control and call various data at different times to execute a plurality of workflow actions. The server 115 can be configured to connect to any component of system 100 via network 110. The server 115 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 115, it is understood that other embodiments can use multiple servers or multiple computer systems as necessary or desired to support the users and can also use back-up or redundant servers to prevent network downtime in the event of a failure of a particular server.

The server 115 can be in data communication with the processor 102. For example, a server 115 can be in data communication with apparatus 105 via one or more networks 110. The apparatus 105 can transmit one or more requests to the server 115. The one or more requests can be associated with retrieving data from the server 115. The server 115 can receive the one or more requests from any component of apparatus 105. Based on the one or more requests from, for example the processor 102, the server 115 can be configured to retrieve the requested data. The server 115 can be configured to transmit the received data to the processor 102, the received data being responsive to one or more requests.

In some examples, the server 115 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a server 115, it is understood that other embodiments can use multiple servers or multiple computer systems as necessary or desired to support the users and can also use back-up or redundant servers to prevent network downtime in the event of a failure of a particular server.

The server 115 can include a processor 117. The processor 117 can be, for example, one or more microprocessors. The processor 102 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The server 115 can include an application comprising instructions for execution thereon. For example, the application can reside in memory 119 of server 115 and can comprise instructions for execution on the server 115. The application of the server 115 can be in communication with any components of system 100. For example, server 115 can execute one or more applications that enable, for example, network and/or data communications with one or more components of system 100 and transmit and/or receive data. Without limitation, the server 115 can be a network-enabled computer. As referred to herein, a network-enabled computer can include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The server 115 also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

System 100 can include one or more databases 120. The database 120 can comprise a relational database, a non-relational database, or other database implementations, and any combination thereof, including a plurality of relational databases and non-relational databases. In some examples, the database 120 can comprise a desktop database, a mobile database, or an in-memory database. Further, the database 120 can be hosted internally by any component of system 100, such as the apparatus 105 or server 115, or the database 120 can be hosted externally to any component of the system 100, such as the apparatus 105 or server 115, by a cloud-based platform, or in any storage device that is in data communication with the apparatus 105 and server 115. In some examples, the database 120 can be in data communication with any number of components of system 100. For example, the server 115 can be configured to retrieve the requested data from the database 120 that is transmitted by the processor 102. Server 115 can be configured to transmit the received data from database 120 to the processor 102 via network 110, the received data being responsive to the transmitted one or more requests. In other examples, the processor 102 can be configured to transmit one or more requests for the requested data from database 120 via network 110.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the apparatus 105, server 115, and/or database 120, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

Figure 2:
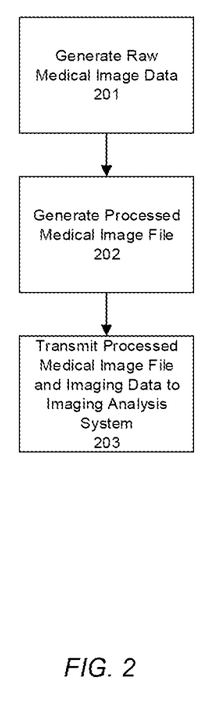
FIG. 2 is a block diagram illustrating an exemplary processes for generating, processing, and transmitting medical image data files in a medical imaging system.

Reference is now made to FIG. 2, which is a block diagram illustrating an exemplary processes for generating, processing, and transmitting medical image data files in a medical imaging system.

In step 201 in FIG. 2 one or more medical imaging systems 125 may generate raw medical image data from medical imaging hardware device 126 of the one or more medical image systems 125. The raw medical image data can reflect a physical characteristics of a patient, and can include binary and/or analog electrical data. For example, raw medical image data recorded may be recorded via an x-ray sensitive plate in one example of a medical imaging hardware device. In such a device, x-ray radiation may be generated, and directed to pass through a patient's femur, striking the x-ray sensitive plate causing the propagation of electrical signals in a digital circuit. The raw medical image data may include the recording of such electric signals. Alternatively, the raw medical image data can include a digital scan of a medical film developed by a particular medical imaging hardware device that does not include digital image sensors or the any other component for directly converting capturing physical characteristics of the patient into binary digital data. The raw medical image data can be stored by the medical imaging system 125 before being processed by medical imaging software application 127, and/or can be transmitted directly to imaging analysis system 105. As described in connection with FIG. 4, the imaging analysis system 105 may advantageously receive and utilize raw medical image data as training data in machine learning models to develop and refine an artifact database for normalizing processed medical image files.

In step 202 in FIG. 2, upon capturing raw medical image data from medical imaging hardware device 127, a processed medical image file can be generated by processing the raw medical image data by the medical imaging software application 127. Raw medical image data can be captured from image sensors, cameras, or other hardware components of the medical imaging hardware device 126, and processed into a processed medical image file with medical imaging software application 127 of medical imaging system 125. Various medical images may be taken over a period of time of a patient, processed by medical imaging software application 127 of the one or more medical imaging systems 127, and stored. The processed medical image file can be a still image type, a moving image type, or a combination thereof. The processed medical image file may be in a variety of image and/or video formats as will be apparent to one of ordinary skill in the art. Once processed, the processed medical image file can be stored, and/or can be transmitted directly to imaging analysis system 105 (as described in step 203 of FIG. 2).

In step 203 in FIG. 2, the processed medical image file can be transmitted to the imaging analysis system 106. The transmission may also include imaging detail data. Imaging detail data can include data pertaining to the identity of the medical imaging hardware device 126 and medical imaging software application 127 used to generate the processed medical image files. For example, imaging detail data identifying the type of MRI imaging device and MM imaging software associated with a processed medical image file may be transmitted to the imaging analysis system 105 along with the processed medical image file.

Figure 3:
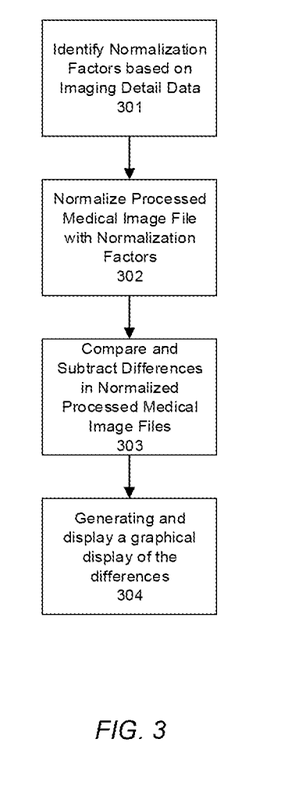
FIG. 3 is a block diagram illustrating an exemplary processes for normalizing processed medical image files, comparing a plurality of normalized processed medical image files, subtracting the difference thereof, and displaying the difference in a graphical user interface.

Reference is now made to FIG. 3, which is a block diagram illustrating an exemplary processes for normalizing processed medical image files, comparing a plurality of normalized processed medical image files, subtracting the difference thereof, and displaying the difference in a graphical user interface.

In step 301 in FIG. 3, the imaging analysis system 105 may identify normalization factors from an artifact database based on the imaging detail data associated with the processed medical image file. As described in connection with FIG. 3, the imaging analysis system may advantageously generate an artifact database by using a multitude of medical image files and/or the raw medical image data from a plurality of different medical image systems 125 as a training set in machine learning models. The artifact database identifies a normalization factor to be applied to processed medical image file depending on the medical imaging hardware device 126 and medical imaging software application 127 used to generate the processed medical image file.

In step 302 in FIG. 3, the imaging analysis system applies the identified normalization factors to normalize the processed medical image file, so to remove the artifacts, and other details characteristic of the specific type of medical imaging systems 125 which generated the processed medical image file.

Normalization of processed medical image files can be performed by the imaging analysis system such that a proper comparison between two or more processed medical image file can be made without regard to the manufacturer, make, model, or manufacture date of the medical imaging hardware device 126 and/or medical imaging software applications 127 used to take each of the medical images by various medical image systems 125. The imaging analysis system 105 can remove artifacts or details in the images due to specific medical imaging hardware devices and/or software applications. For example, the imaging analysis system can remove any "signatures" due to a specific medical image system 125.

In step 303, in FIG. 3, the imaging analysis system 105 may compare the normalized processed medical image file with at least one other normalized processed medical image file generated at a different point in time, and subtract the portions of the normalized processed medical image files which are the same, such that only differences between the normalized processed medical image files are the same. The imaging analysis system 105 may employ the AI engine to utilize machine learning models to compare the normalized processed medical image files in this step. Although the compared files are normalized, machine learning can be used to analyze any differences between the normalized processed medical image files that might be due to the posture or positioning of the patient when imaging was conducted. In order to determine the medical image 'uncertainty" due to the positioning of patient or the patient posture it may be required to generate multiple images and analyze the results using a machine learning algorithm.

In step 304 in FIG. 3, the imaging analysis system 105 may generate a file corresponding to the differences between the normalized processed medical image files, and generate a graphical representation of the differences in a graphical user interface. The graphical representation can include a three-dimensional rendition of any differences between the normalized processed medical image files.

Figure 4:
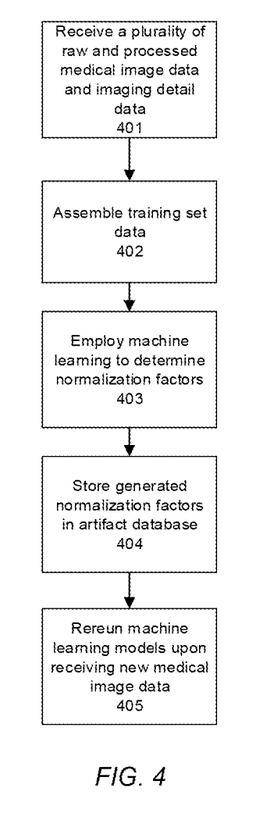
FIG. 4 is a block diagram illustrating the process for generating an artifact database.

Reference is now made to FIG. 4 which is a block diagram illustrating the process for generating an artifact database.

At step 401 of FIG. 4, the imaging analysis system may receive a plurality of raw medical image data, processed medical image files, and associated imaging detail data from different medical imaging systems 125. Raw medical image data and processed medical image files pertaining to a multitude of patients and a variety of different parts of patients' bodies may advantageously be used by the AI engine in a machine learning model to determine the artifacts, and other details characteristic of different types of medical imaging systems 125.

At step 402 of FIG. 4, the AI engine 106 or some other component of the imaging analysis system 105 may assemble the received raw medical image data, processed medical image files, and associated imaging detail, and any other such data in data storage 104, or available in database 120 or server 115, as training data for a machine learning model. The training data may be formatted or otherwise standardized in step 402 of FIG. 4.

At step 403 of FIG. 4, the AI engine may employ machine learning models, such as cluster analysis, and supervised machine learning, using the training data set to determine normalization factors for a specific type of medical imaging hardware device 126, medical imaging software application 127, and different combinations thereof used to generate processed medical image files. The normalization factors can define operations to be performed on processed medical image files so that the file is of a certain normalized standard and can be readily compared to other normalized processed medical image files generated from different medical imaging hardware devices 126, and medical imaging software applications 127. Artifacts and defects caused by particular medical imaging hardware devices 126, and medical imaging software applications 127 may be due to a defect in the specific hardware device or software application from wear and tear, and/or lack of proper maintenance, or may be a result of a manufacturing or development defect or the like, which affects all of a particular type of medical imaging hardware device 126, or medical imaging software application 127.

At step 404 upon generation of normalization factors, the normalization factors as well as information pertaining to the medical imaging hardware devices 126, and medical imaging software applications 127 associated with each generated normalization factor may be stored in an artifact database. The image analysis system can advantageously call or reference data from the artifact database in the processes described in connection with FIGS. 2 and 3 when normalizing processed medical image files for comparison.

At step 405 the machine learning model may be ran as additional raw medical image data and processed medical image files are received. The machine learning model can be reran on a periodic basis (assuming that additional data is received in between such periods), or can be ran on an ad hoc basis. As the training set grows with the addition of new medical image data, the machine learning model may generate more accurate normalization factors for various types of medical imaging hardware devices 126 medical imaging software applications 127 included in the training data.

In exemplary embodiments the imaging analysis system 105 may aggregate normalizing processed medical image files for a plurality of patients suffering from a particular medical issue, associated medical information data. Medical information data may include, treatments including drug treatments, surgeries, therapy, and the like. Medical information may also include personal information of the patient, such as genetic history, the patients BMI, cholesterol level, exercise level, nutrition, and other information related to the overall health of the patient. Medical issues may include specific types of cancers, types of heart disease, types of soft tissue injuries, and the like. The imaging analysis system may use machine learning on a training data set comprising processed medical image files and associated medical information data from a plurality of patients suffering from similar medical issues, in order to determine the efficacy of certain treatments on certain medical issues, to improve diagnosis of medical issues through use of medical imaging on an object basis, and to compare patient outcomes.

In some embodiments Point Spread Function may be employed. Point Spread Function may be the response of an imaging system to a point source or a point object. The image is the results of convolution of the Point Spread Function with the object. The Point Spread Function for a specific imaging system can be measured or can be calculated. In medical imaging different techniques may be used for imaging of the human body and every time a new image is created, the Point Spread Function associated with the particular imaging system may be convolved with the "human object". Deconvolution of the image may be performed with the Point Spread Function. By performing this operation, one may achieve one or more of the following: (1) a new image or images for medical interpretation that has higher resolution and/or (2) an imprint of a specific apparatus or device used in imaging may be removed so that images from various devices may be better compared and/or (3) a more accurate medical diagnostic may be achieved by repeating the medical imaging at different times and comparing the results (e.g., 'time-lapse" medical imaging).

In an exemplary embodiment, the processing of medical images for improving the image may include the use of time reversal imaging for 'time-lapse medical imaging" as is described below.

Time-reversal imaging method consists in recording the imaging signal by an array of receivers (transducers), reverting it in time and retransmitted the inverted signal into the medium (for example a human body). By performing this operation, the sources that emitted the signal are refocused. In this way the image resolution could be increased.

In time-lapse medical imaging the investigation of the human body with different imaging methods (ex. ultrasound) is performed at different times.

Time-reversal imaging may be used in the context of time-lapse medical imaging. Assume that the first medical imaging investigation is performed at time T1. Measured data at time T1 is reversed in time, TR1, and repropagated through the human body. The result should be an enhanced imaged and called TR11.

The next medical imaging investigation is performed at the time T2; the measured data is reversed in time, TR2 and repropagated through the human body. The result is an enhanced imaged TR22.

The TR1 could also be repropagated through the human body at time T2 and the result is TR21. By comparing TR22 with TR21 one can, for example, make better inferences about the changes in the human body that occurred between T1 and T2, based on time-reversal imaging concept.

The concept of time-lapse medical imaging could be extended at more than two medical imaging investigations. For example, for three times, it could be possible to compare: TR21, TR22, TR31, TR32 and TR33. The measured and reversed data that are retransmitted through the human body are: TR1,TR2,TR3

In exemplary embodiments, the generated normalization factors contained in the artifact database may be used to reconfigure existing types of medical imaging hardware devices and software applications, and during the development process of designing new medical imaging hardware devices and software applications. In this regard, existing types of medical imaging hardware devices and software applications can be reconfigured using the normalization factors contained in the artifact database to eliminate or substantially minimize artifacts, and other distortions created in their generation of raw medical image data and processed medical image files. In a similar vein, the machine learning processes and database of normalization factors may be used during the development process of new of medical imaging hardware devices and software applications for the same purpose.

In exemplary embodiments, the imaging analysis system 105 may apply machine learning processes to a data set consisting of aggregated normalized processed medical image files for a plurality of patients suffering from a particular medical issue, and associated medical information data thereof to make medical forecasts and predictions for a patient suffering from the particular medical issue. Such machine learning processes may use cluster analysis, for example, to correlate a specific patient's outcome based on the outcome of similarly situated patients. By adding aggregated normalized processed medical image files of both the patient, and of other similarly situated patients, to the training data set, the imaging analysis system 105 can make accurate predictions for the outcome of patients based on objective data (i.e. the aggregated normalized processed medical image files). Further, the image analysis system 105 in this embodiment can make suggestions for diet, exercise, or other modified behaviors to improve the longer term health forecasts and can predict changes to a longer term forecast based on suggested modifications. Such suggestions may be generated by using the machine learning methodology described above, so that the health behaviors (e.g. the diet, and level of exercise) of similarly situated patients will be considered in a cluster analysis so that AI module or other component can consider such health behaviors, in connection with objective data provided by the aggregated normalized processed medical image files, and other associated medical information.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A computer implemented method for medical imaging and analysis, comprising:
    generating raw medical image data from a medical imaging hardware device;
    processing the raw medical image data, and generating a processed raw medical image file;
    transmitting the processed raw medical image file and imaging detail data;
    identifying a normalization factor based on the imaging detail data;
    normalizing the processed raw medical image file using the normalization factor;
    comparing the normalized processed raw medical image file with at least one other processed medical image file, and subtracting the difference between the normalized processed raw medical image file with the at least one other processed medical image file; and
    generating and displaying in a graphical user interface of a device, a graphical representation of the difference by the imaging and analysis system
    wherein the normalizing comprises using a point spread function associated with the medical imaging hardware device.

2. The computer implemented method of claim 1, wherein the normalization factor is generated with a machine learning model using a training data set comprising medical image data files from a plurality of types of medical imaging software applications and hardware devices.

3. The computer implemented method of claim 2, wherein the training data set further comprises raw medical image data from a plurality of types of medical imaging hardware devices.

4. The computer implemented method of claim 2, wherein the machine learning model includes at least one selected from the group of a hidden Markov model, a Gaussian mixture model, a pattern matching algorithm, a neural network, a matrix representation, a vector quantization and decision tree, a supervised learning model, an unsupervised learning model, a semi-supervised learning model, a reinforcement learning model, a self-learning model, and a feature learning model.

5. The computer implemented method of claim 2, wherein one of a medical imaging hardware device and a medical imaging software application is reconfigured based on the normalization factor.

6. The computer implemented method of claim 1, wherein the processed raw medical image file is a still image type, a moving image type, or a combination thereof.

7. The computer implemented method of claim 1, wherein the medical imaging hardware device includes one of a MRI imaging device, x-ray imaging device, fluoroscopy imaging device, ultrasound device, endoscopy device, elastography device, thermography imaging device.

8. The computer implemented method of claim 1, further comprising:
generating a training data set comprising of processed medical image files and associated medical information data from a plurality of patients with a medical issue type;
training a predictive model using the training data set to determine at least one health prediction.

9. The computer implemented method of claim 8, wherein the associated medical information includes health behavior data, and wherein the predictive model determines at least one behavior modification suggestion.

10. A computer implemented medical imaging and analysis system, comprising:
a medical imaging hardware device;
a medical imaging software application;
and an artificial intelligence (AI) engine in data communication with the data storage and coupled to an application programming interface (API) that enables transmission of real time data through the communication interface; and
wherein the medical imaging hardware device is configured to generate raw medical image data;
wherein the medical imaging software application is configured:
process the raw medical image data, and generate a second processed raw medical image file; and
transmit the raw medical image data and the processed raw medical image file to the AI engine;
wherein the AI engine is configured to:
identify a normalization factor based on the raw medical image data;
normalize the processed raw medical image file using the normalization factor;
compare the normalized processed raw medical image file with at least one other processed raw medical image file, and subtract the difference between the normalized processed raw medical image file and the at least one other processed raw medical image file;
generate and display in a graphical user interface of a device, a graphical representation of the difference by the imaging and analysis system
wherein the processed raw medical image is normalized using a point spread function associated with the medical imaging hardware device.

11. The computer implemented system of claim 10, wherein the normalization factor is generated by the AI engine with a machine learning model using a training data set comprising medical image data files from a plurality of types of medical imaging software applications and hardware devices.

12. The computer implemented system of claim 11, wherein the training data set further comprises raw medical image data from a plurality of types of medical imaging hardware devices.

13. The computer implemented system of claim 11, wherein the machine learning model includes at least one selected from the group of a hidden Markov model, a Gaussian mixture model, a pattern matching algorithm, a neural network, a matrix representation, a vector quantization and decision tree, a supervised learning model, an unsupervised learning model, a semi-supervised learning model, a reinforcement learning model, a self-learning model, and a feature learning model.

14. The computer implemented method of claim 11, further comprising one of a medical imaging hardware device and a medical imaging software application wherein the one of a medical imaging hardware device and a medical imaging software application is configured to reconfigured based on the normalization factor.

15. The computer implemented system of claim 10, wherein the processed raw medical image file is a still image type, a moving image type, or a combination thereof.

16. The computer implemented system of claim 10, wherein the medical imaging hardware device comprises one of a MRI imaging device, x-ray imaging device, fluoroscopy imaging device, ultrasound device, endoscopy device, elastography device, thermography imaging device.

17. The computer implemented system of claim 10, wherein
the AI engine is further configured to:
generate a training data set comprising of processed medical image files and associated medical information data from a plurality of patients with a medical issue type;
train a predictive model using the training data set to determine at least one health prediction.

18. The computer implemented system of claim 17, wherein the associated medical information includes health behavior data, and wherein the predictive model is further configured to determine at least one behavior modification suggestion.

19. A non-transitory computer-accessible medium having stored thereon computer-executable instructions for medical imaging and analysis, wherein the computer arrangement comprises an artificial intelligence (AI) engine, a medical imaging hardware device, and a medical imaging software application and is configured to perform procedures comprising:
generating raw medical image data from the medical imaging hardware device;
processing the raw medical image data, and generating a processed raw medical image file by the medical imaging software application;
transmitting the processed raw medical image file and imaging detail data by the medical imaging software application;
identifying a normalization factor based on the imaging detail data by the AI engine;
normalizing the processed raw medical image file using the normalization factor by the AI engine;
comparing the normalized processed raw medical image file with at least one other processed medical image file, and subtracting the difference between the normalized processed medical image file with the at least one other processed medical image file by the AI engine; and
generating and displaying in a graphical user interface of a device, a graphical representation of the difference
wherein the normalizing comprises using a point spread function associated with the medical imaging hardware device.

20. A computer implemented method for medical imaging and analysis, comprising:
generating raw medical image data from a medical imaging hardware device;
processing the raw medical image data, and generating a processed raw medical image file;
transmitting the processed raw medical image file and imaging detail data;

identifying a normalization factor based on the imaging detail data;

normalizing the processed raw medical image file using the normalization factor;

comparing the normalized processed raw medical image file with at least one other processed medical image file, and subtracting the difference between the normalized processed raw medical image file with the at least one other processed medical image file; and generating and displaying in a graphical user interface of a device, a graphical representation of the difference by the imaging and analysis system;

wherein the method further comprises generating a training data set comprising of processed medical image files and associated medical information data from a plurality of patients with a medical issue type;

training a predictive model using the training data set to determine at least one health prediction;

wherein the associated medical information includes health behavior data, and wherein the predictive model determines at least one behavior modification suggestion.

21. A computer implemented medical imaging and analysis system, comprising:

a medical imaging hardware device;

a medical imaging software application;

and an artificial intelligence (AI) engine in data communication with the data storage and coupled to an application programming interface (API) that enables transmission of real time data through the communication interface; and wherein the medical imaging hardware device is configured to generate raw medical image data;

wherein the medical imaging software application is configured:

process the raw medical image data, and generate a processed raw medical image file; and transmit the raw medical image data and the processed raw medical image file to the AI engine;

wherein the AI engine is configured to:

identify a normalization factor based on the raw medical image data;

normalize the processed raw medical image file using the normalization factor;

compare the normalized processed raw medical image file with at least one other processed raw medical image file, and subtract the difference between the processed raw medical image file and the at least one other processed raw medical image file;

generate and display in a graphical user interface of a device, a graphical representation of the difference by the imaging and analysis system;

wherein the AI engine is further configured to:

generate a training data set comprising of processed medical image files and associated medical information data from a plurality of patients with a medical issue type;

train a predictive model using the training data set to determine at least one health prediction;

wherein the associated medical information includes health behavior data, and wherein the predictive model is further configured to determine at least one behavior modification suggestion.

* * * * *